(12) United States Patent
Sakaki et al.

(10) Patent No.: US 6,174,056 B1
(45) Date of Patent: *Jan. 16, 2001

(54) COLOR INK-JET RECORDING METHOD

(75) Inventors: Mamoru Sakaki, Yamato; Eiichi Suzuki, Asaka; Masato Katayama, Yokohama; Mifune Hirose, Machida, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/539,267

(22) Filed: Oct. 4, 1995

(30) Foreign Application Priority Data

| Oct. 7, 1994 | (JP) | 6-244006 |
| Aug. 2, 1995 | (JP) | 7-197542 |
| Sep. 21, 1995 | (JP) | 7-243033 |

(51) Int. Cl.⁷ .................................................. G01D 11/00
(52) U.S. Cl. ........................................ 347/100; 347/105
(58) Field of Search .............................. 347/100, 105; 106/20 D (56) References Cited

U.S. PATENT DOCUMENTS

| 4,189,734 | * | 2/1980 | Kyser et al. ...................... 346/1.1 |
| 4,243,994 | * | 1/1981 | Kobayashi et al. ............ 346/140 R |
| 4,463,359 | * | 7/1984 | Ayata et al. ...................... 346/1.1 |
| 4,478,910 | | 10/1984 | Oshiwa et al. ................... 428/331 |
| 4,636,805 | | 1/1987 | Toganoh et al. .................. 346/1.1 |
| 4,664,952 | | 5/1987 | Arai et al. ...................... 427/256 |
| 4,686,118 | | 8/1987 | Arai et al. ...................... 427/261 |
| 4,723,129 | | 2/1988 | Endo et al. ...................... 346/1.1 |
| 4,740,796 | | 4/1988 | Endo et al. ...................... 346/1.1 |
| 4,758,461 | | 7/1988 | Akiya et al. ..................... 428/212 |
| 4,785,313 | | 11/1988 | Higuma et al. ................. 346/135.1 |
| 4,832,984 | | 5/1989 | Hasegawa et al. ............... 427/161 |
| 4,849,774 | | 7/1989 | Endo et al. ..................... 346/140 R |
| 4,877,680 | | 10/1989 | Sakaki et al. .................... 428/332 |
| 4,931,810 | * | 6/1990 | Iwata et al. ..................... 346/1.1 |
| 4,956,223 | | 9/1990 | Arai et al. ...................... 428/212 |
| 4,957,553 | | 9/1990 | Koike et al. ..................... 106/20 |
| 4,965,612 | | 10/1990 | Sakaki et al. .................... 346/1.1 |

(List continued on next page.)

FOREIGN PATENT DOCUMENTS

| 0461939 | 12/1991 | (EP) . |
| 0487350 | 5/1992 | (EP) . |
| 500021 | * 8/1992 | (EP) . |
| 0529308 | 3/1993 | (EP) . |
| 0588241 | 3/1994 | (EP) . |
| 54-59936 | 5/1979 | (JP) . |
| 59-20696 | * 2/1984 | (JP) . |
| 63-139964 | 6/1988 | (JP) . |
| 63-265680 | 11/1988 | (JP) . |
| 3-26665 | 4/1991 | (JP) . |
| 5-36237 | 5/1993 | (JP) . |
| 647914 | * 2/1994 | (JP) .................................. 347/47 |

OTHER PUBLICATIONS

Patent Abstracts of Japan, vol. 10, No. 56. (C–331) Mar. 6, 1986 with respect to JP 60–197778 of Oct. 7, 1985.
Patent Abstracts of Japan, vol. 12, No. 398 (C–538) Oct. 21, 1988 with respect to JP 63–139964 of Jun. 11, 1988.
Patent Abstracts of Japan, vol. 13, No. 60 (M–796) Feb. 10, 1989 with respect to JP 63–265680 of Nov. 2, 1988.

* cited by examiner

*Primary Examiner*—John Barlow
*Assistant Examiner*—Michael Brooke
(74) *Attorney, Agent, or Firm*—Fitzpatrick, Cella, Harper & Scinto (57) ABSTRACT

An image-forming method using color ink having a surface tension of 25 to 40 dyne/cm. The color ink is applied to a glossy recording medium having a porous structure including a pigment, a binder and a cationic material.

20 Claims, 3 Drawing Sheets

U.S. PATENT DOCUMENTS

| | | | |
|---|---|---|---|
| 5,041,328 | 8/1991 | Akiya et al. | 428/212 |
| 5,075,699 | 12/1991 | Koike et al. | 346/1.1 |
| 5,081,470 | 1/1992 | Kurabayashi et al. | 346/1.1 |
| 5,101,218 | 3/1992 | Sakaki et al. | 346/1.1 |
| 5,122,814 | 6/1992 | Endo et al. | 346/33 R |
| 5,137,778 | 8/1992 | Nakatsugawa et al. | 428/330 |
| 5,159,349 | 10/1992 | Endo et al. | 346/33 A |
| 5,182,175 | 1/1993 | Sakaki et al. | 428/537.5 |
| 5,246,774 | 9/1993 | Sakaki et al. | 428/323 |
| 5,277,962 | 1/1994 | Nakatsugawa et al. | 428/206 |
| 5,320,898 | 6/1994 | Yoshida et al. | 428/195 |
| 5,362,558 | 11/1994 | Sakaki et al. | 428/323 |
| 5,382,283 * | 1/1995 | Yui et al. | 106/22 R |
| 5,526,031 * | 6/1996 | Kurabayashi | 347/105 |
| 5,576,088 * | 11/1996 | Ogawa et al. | 428/327 |

COLOR INK-JET RECORDING METHOD

BACKGROUND OF THE INVENTION

1. Field of the Invention

This invention relates to an image-forming method which makes it possible to provide an image having high density and high resolution and, more particularly, to an image-forming method suitable for providing a recorded image having improved surface gloss. The present invention also relates to an image-forming method suitable for providing a recorded image having improved waterfastness.

2. Description of the Related Art

Conventionally, recording paper such as that described in Japanese Patent Publication No. 26665/1991 and glossy paper such as that described in Japanese Patent Publication No. 36237/1993 have been used as recording mediums for forming images by ink-jet recording methods. The recording paper described in Japanese Patent Publication No. 26665/1991 has a base paper and a coating layer formed on the base paper, the coating layer containing a fine silica powder and a water-soluble binder such as polyvinyl alcohol. The glossy paper described in Japanese Patent Publication No. 36237/1993 has a non-transparent base such as synthetic paper and a film comprising mainly a water-soluble resin and formed on the non-transparent base. Japanese Patent Laid-Open Publication No. 265680/1988 discloses cast-coated paper in which a coating layer comprising mainly silica and a binder is formed by a cast coating method.

Recently, with improvements in the performance of ink-jet recording apparatus, e.g., increase in speed, increase in the number of recording colors and so on, there has been a need for an ink-jet recording medium having various improved properties, e.g., (1) high ink absorbing ability and high ink drying speed,
(2) capability of maintaining a high optical density of the dots and freedom from blurring around the dots,
(3) capability of forming a dot shape close to a true circle with a smooth peripheral line,
(4) capability of maintaining improved uniformity of the solid printed portion, or freedom from density unevenness in the solid portion,
(5) capability of forming a sharp boundary even when inks of different colors are printed adjacent each other,
(6) capability of maintaining good waterfastness and light fastness of images such that the images are stably maintained without changing in quality during long-term preservation.

There is also a need for being able to form, by an ink-jet recording method, an image having a high degree of gloss on the surface of a recording medium, and recording on a recording sheet (glossy paper) having surface gloss is also required.

The coated paper described in Japanese Patent Publication No. 26665/1991 has a mat surface tone and has no gloss. On the other hand, a high-gloss and high-density image can be formed on the glossy paper described in Japanese Patent Publication No. 36237/1993. However, since the surface of this paper is formed by a hydrophilic resin coating, the time it takes to dry and fix ink attached to its surface is long, and a printed portion remains sticky long enough to hinder continuous recording. Also, the ink-absorbing speed is so low that non-uniformity of density can occur easily in a solid printed portion. There is also the problem of a formed image being low in waterfastness because the ink-receiving layer is water-soluble.

The cast coated paper for ink-jet recording described in Japanese Patent Laid-Open Publication No. 265680/1988 has good characteristics with respect to drying and fixation of ink, but entails problems in terms of waterfastness of images, blurring at the boundary between different colors (hereinafter referred to as "boundary blur") and uniformity of the solid portion.

Attempts have been made to improve recording sheets to deal with the problems of low solid uniformity and boundary blur, which are serious in an image-forming process using a recording sheet having surface gloss, but satisfactory recording sheets have not been obtained. Also, essentially no attempts have been made to solve these problems with respect to both improving the ink and improving the recording sheets.

SUMMARY OF THE INVENTION

In view of these problems, an object of the present invention is to provide an image-forming method simultaneously satisfying the above-mentioned required characteristics.

Another object of the present invention is to provide an image-forming method for forming a recording image having high density, high resolution and high gloss.

Still another object of the present invention is to provide an image-forming method suitable for forming a high-quality pictorial image free from the problems of boundary blur and non-uniformity of the solid portions.

To achieve these objects, the present invention provides an image-forming method in which a droplet of each of color inks of cyan, magenta and yellow is attached to a recording medium by being ejected through an orifice of a recording head in accordance with a recording signal to form an image. The method comprises using a recording medium having a base and a coating layer provided on the base and which has a porous structure including a pigment, a binder and a cationic material and having surface gloss, and preparing the color inks so that each ink has a surface tension within the range of 25 to 40 dyne/cm.

These and other objects, features and advantages of the present invention will become apparent from the following detailed description of the invention.

DESCRIPTION OF THE PREFERRED EMBODIMENTS

The inventors of the present invention made studies of image-forming methods for forming an image with surface gloss as high as that of silver salt photographs, by using an ink-jet recording method. They found that the conditions described below are important in forming an image satisfying the above-mentioned requirements.

(i) An ink-receiving layer of a recording medium should have a porous structure formed mainly by a pigment and a binder and should have a particular degree of surface glossiness.

(ii) The ink-receiving layer should contain a cationic material as a fixing agent for fixing a dyestuff.

(iii) Properties of the recording medium surface and ink should be adjusted so as to have suitable wettability.

Condition (i) is indispensable for achieving a high image density, high gloss and high-speed ink fixation. Such a recording medium has ink absorption higher than that of glossy paper of the type disclosed in Japanese Patent Publication No. 36237/1993, and therefore has the effect of improving image qualities with respect to uniformity of solid portions, boundary blur and the like. However, the effect of improving image quality is not sufficiently high if the recording density is increased. Condition (ii) is indispensable for improving the waterfastness of the image. If both conditions (i) and (ii) are not satisfied, the recording medium is liable to have decreased ink absorption and deteriorated image quality. Condition (iii) is indispensable for solving these other problems relating to image quality.

It is believed that the problems of uniformity of solid portions and boundary blur are not only due to deficient ink absorption of the recording medium, but also to wettability between ink attached to the recording sheet and the recording sheet surface. That is, on a portion of a recording sheet where solid printing recording or similar recording is performed, if the wettability of the ink with the recording sheet surface is insufficient, unfixed ink droplets which are intended to form adjacent pixels on the sheet surface group into units of several or several tens of droplets joining each other irregularly while being isolated from other droplets. Such a gathering of ink droplets can be seen macroscopically as unevenness of density. This phenomenon is due to, among other causes, small variations in the positions at which the ink droplets reach the recording sheet surface. Conversely, if the wettability is high, almost all the unfixed ink droplets join each other uniformly, so that the recording portion is free from unevenness of density and appears to be uniform. However, if the wettability is excessively high, such joining occurs at the boundary between image portions recorded with inks of different colors so that the colors are mixed. That is, the problem of boundary blur arises, making the boundary indefinite. Thus, these problems are difficult to solve if only the recording medium is improved.

Surface-glossy recording mediums referred to in this specification have a 75° specular gloss of 45% or higher at least on one side. The value of 75° specular gloss is measured in accordance with JIS-Z-8741.

If an image having a surface gloss equivalent to that of silver salt photographs is to be formed, it is desirable that the 75° specular gloss be 65% or higher, and it is necessary that the 20° specular gloss be 20% or higher. The 20° specular gloss is, more preferably, 30% or higher.

The present invention will be described in more detail with respect to embodiments thereof.

A recording medium used in accordance with the present invention is formed of a base and a coating layer provided on the base. The coating layer has pigment and binder as its main constituents.

Examples of the pigment are inorganic pigments, such as silica, aluminum silicate, magnesium silicate, basic magnesium carbonate, talc, clay, hydrotalcite, calcium carbonate, titanium oxide and zinc oxide, and plastic pigments, such as polyethylene, polystyrene and polyacrylate. To form a high-density high-resolution image, it is preferable to use at least one of silica and basic magnesium carbonate.

Examples of the binder are water-soluble resins, such as polyvinyl alcohol, starch, cationic starch, casein, gelatin, acrylic resin, sodium alginate, polyvinylpyrrolidone, carboxymethyl cellulose and hydroxyethyl cellulose, acrylic polymer latexes, such as polymers or copolymers of acrylic ester and methacrylic ester, conjugated diene copolymer latexes, such as those that are carboxyl-modified, and vinyl copolymer latexes, such as ethylene-vinyl acetate copolymers. Only one of or a combination of two or more of these binders may be used. Of these binders, it is preferable to use polyvinyl alcohol, carboxymethyl cellulose, an acrylic polymer latex, a conjugated diene copolymer latex, or an ethylene-vinyl acetate copolymer, because the desired image density, ink absorption and gloss can be simultaneously achieved if such binder is used.

The coating layer may further contain, as needed, a melamine resin, a crosslinking agent, such as glyoxal or isocyanate, a surfactant, an antifoamer, an antioxidant, a fluorescent brightener, an ultraviolet absorber, a dispersant, a viscosity modifier, a pH adjuster, a mildewproofing agent, a plasticizer, and other materials.

The ratio of pigment to binder is 10/1 to 1/2 and, more preferably, 5/1 to 1/1, by weight.

If the amount of pigment is larger than the upper limit determined by this ratio, the strength of the coating layer is disadvantageously small. Conversely, if the amount of the binder is excessively large, the ink absorption is liable to be reduced, so that beading or boundary blur can occur easily.

Further, according to the present invention, the coating layer may also contain a cationic material, which may comprise a cationic resin, as a dyestuff fixer. Examples of the cationic material are polyallylamine and salts thereof (e.g., hydrochloride), polyaminesulfone and salts thereof (e.g., hydrochloride), polyvinylamine and salts thereof (e.g., hydrochloride), and chitosan and salts thereof (e.g., acetate). Monomers having a cationic group, e.g., monomers having primary to tertiary amine or quaternary amino-base as a side chain, such as dimethylaminoethylacrylate, dimethylaminoethylmethacrylate, diethylaminoethylacrylate, diethylaminoethylmethacrylate, methylethylaminoethylacrylate, methylethylaminoethylmethacrylate, dimethylaminostyrene, diethylaminostyrene, methylethylaminostyrene, and quaternary compounds of the same, may also be used. Each of such monomers may be used singly, and copolymers of such monomers and other monomers can also be used. Also, a portion of the above-mentioned binder resins may be changed into a cation. More specifically, a copolymer of vinylpyrrolidone and quaternary salt of aminoalkylalkylate and acrylamide and quaternary salt of aminomethylacrylamide can be used. These compounds, however, are not exclusively used. It is most preferable that the above-mentioned polymer materials and cationic polymer materials be water-soluble. However, a dispersion such as a latex or emulsion may suffice. Of these cationic materials, it is preferable to use polyallylamine, polyvinylamine, chitosan or salts of these amines, for improved waterfastness of the images.

The content of the cationic material in the coating layer is 0.1 to 30 wt % and, more preferably, 2 to 20 wt %.

The base may be formed of a material mainly composed of paper, such as chemical pulp represented by LBKP or NBKP, a sizing agent, a loading material, containing any other paper additives as needed, and made by an ordinary method. As pulp for forming the base, mechanical pulp and waste paper regenerated pulp may be additionally used. Also, the base may be mainly formed of these kinds of pulp. Examples of the sizing agent are rosin size, alkyl ketene dimer, alkenyl succinic acid anhydride, a petroleum resin size, epichlorhydrin, and acrylamide. Examples of the loading material are calcium carbonate, kaolin, talc, and titanium dioxide. A film or a plate may also be used which is formed of a transparent or non-transparent plastic such as polyethylene terephthalate, diacetate, triacetate, cellophane, celluloid, polycarbonate, polyimide, polyvinyl chloride, polyvinylidene chloride, polyacrylate, polyethylene, or polypropylene.

The recording medium used in accordance with the present invention is made as described below. First, compounds for forming the coating layer and, if desired, other additives, are dissolved or dispersed in water, alcohol or any other suitable organic solvent, thus preparing a coating liquid. One coating layer or two or more coating layers are formed on the base by using the above-mentioned materials.

The coating liquid obtained is applied to the surface of the base, for example, by a roll coating method, a blade coating method, an air knife coating method, a gate roll coating method, a bar coating method, a size pressing method, a spray coating method, a gravure coating method, a curtain coating method or the like. If a plurality of coating layers are provided, the first layer is formed by one of the above-mentioned methods and is dried by an ordinary method, and the above-described coating liquid is applied to the first layer.

According to the present invention, it is preferable to perform gloss finishing by using the above-mentioned coating layer constituent materials to form the desired coating layer after the coating liquid has been applied to the surface of the base in the above-described manner.

In order to provide a glossy finish, a cast coating method or a method of applying and drying the coating liquid by the above-described method and then using a super calender or a gloss calender, may be used. A cast coating method is most suitable for forming a recording medium having excellent gloss and excellent ink jet recording characteristics, e.g., high ink absorbance.

The coating weight is preferably within the range of 3 to 40 $g/cm^2$ in dry weight. A cast coating method, a wet cast coating method, a rewet cast coating method or a gel cast method, for example, may be used. In the wet cast coating method, a glossy finish is made by pressing a wet coated layer to a heated drum having a mirror-finished surface. In the rewet cast coating method, a glossy finish is made by temporarily drying a wet coating layer, thereafter rewetting and plasticizing the coating layer, and pressing the coating layer to a heated drum having a mirror-finished surface. In the gel cast method, a wet coated surface is made to gel and is pressed to a heated drum having a mirror-finished surface.

If a cast coating method is used, it is preferable, in terms of ink absorption, to form a porous structure by forming a lower layer of the above-mentioned pigment, binder and cationic material and by forming an upper layer, having gloss, and comprising a latex selected from acrylic polymer latexes, conjugated diene copolymer latexes, or ethylene-vinyl acetate copolymer latexes.

The image-forming method of the present invention is also characterized by using color inks (yellow, magenta, cyan) having surface tensions within the range of 25 to 40 dyne/cm and, more preferably, within the range of 30 to 40 dyne/cm to perform recording on the above-described recording medium. If color inks having a surface tension greater than 40 dyne/cm are used, the occurrence of beading is considerably increased even if the recording medium of the present invention is used. If the surface tension is less than 25 dyne/cm, an image free from beading can be obtained but boundary blur occurs in the image.

This restriction does not apply to black ink. Black ink having a surface tension in the range of 25 to 55 dyne/cm may be prepared so as to be satisfactory.

All surface tension values, referred to in this specification, are measured at 25° C.

Ink used in accordance with the present invention is prepared by providing, as essential constituents, a coloring matter for forming an image and a liquid medium for dissolving or dispersing the coloring matter, and by adding various additives such as a dispersant, a surfactant, a viscosity modifier, a resistivity modifier, a pH adjuster, a mildewproofing agent, an agent or stabilizing dissolution (or dispersion) of the coloring matter, as desired.

Examples of coloring matters for use in ink are direct dyes, acid dyes, basic dyes, reactive dyes, food dyes, disperse dyes, oil dyes, and various pigments. It is preferable to use direct dyes and acid dyes among such dyes if color development and light resistance of images are considerations. The content of such coloring matters is determined according to the kinds of liquid medium components and the required characteristics of the ink. Coloring matters are used at about 0.1 to 20 wt % and, more preferably, 1 to 10 wt % in ink.

The liquid medium of the ink used in accordance with the present invention may be water or a mixture of water and a water-soluble organic solvent. A mixture of water and a water-soluble organic solvent is particularly preferred. The liquid medium may contain, as a water-soluble organic solvent, a water-miscible glycol or glycol ether which prevents the ink from drying.

Examples of water-soluble organic solvents usable in accordance with the present invention are alkyl alcohols, such as methanol, ethanol, isopropyl alcohol and n-butanol; amides, such as dimethylformamide and dimethylacetamide; ketones and ketone alcohols, such as acetone and acetone alcohol; alkylene glycols, such as ethylene glycol, propylene glycol, triethylene glycol, thioglycol, diethylene glycol, 1,2,6-hexanetriol and ethylene glycol; glycerins; alkyl ethers of polyhydric alcohols, such as (di)ethylene glycol monomethyl(or ethyl) ether, and triethylene glycol mono-(or di-)methyl(or ethyl) ether; sulfolane, N-methyl-2-pyrrolidone, and 1,3-dimethyl-2-imidazolidinone. One or more of these compounds may be used.

To prepare an ink in accordance with the present invention, the above-described compounds are used and a surfactant or the like is added to adjust the above-mentioned predetermined surface tension as desired.

The surfactant may be noionic, anionic or cationic. Examples of nonionic surfactants are polyoxyethylene alkyl ethers, such as polyoxyethylene lauryl ether and polyoxyethylene cetyl ether; polyoxyethylene alkyl phenyl ethers, such as polyoxyethylene nonyl phenyl ether and polyoxyethylene octyl phenyl ether; sorbitan fatty acid esters, such as sorbitan monooleate and sorbitan tristearate; glycerin fatty acid esters, such as glyceryl monostearate and glyceryl monooleate; polyoxyethylene alkylamines, polyoxyethylene alkylamides, polyoxyethylene fatty acid esters, polyglycerin fatty acid esters, propylene glycol fatty acid esters, pentaerythritol fatty acid esters, acetylene glycol, acetylene alcohol and fluorine containing surfactants. Examples of anionic surfactants are alkylsulfate, polyoxyethylene alkyl ether sulfate, polyoxyethylene alkyl ether phosphate, alkylbenzenesulfonate and alkyl sulfosuccinate. Examples of cationic surfactants are quaternary ammonium salts, such as benzalkonium chloride and cetyltrimethyl ammonium chloride. The surfactant used in accordance with the present invention is not limited to these surfactants. Among these surfactants, acetylene glycol and acetylene alcohol are particularly preferred.

An example of an ink containing acetylene glycol and acetylene alcohol as described above is the ink described in Japanese Patent Laid-Open Publication No. 139964/1988. However, the preferable range of the surface tension of the ink described in this publication is 35 to 65 dyne/cm, which only partially overlaps with the preferable surface tension range of the present invention. According to the present invention, as described above, recording is performed on a specially-formed recording medium by using ink having a surface tension in a particular range, thereby making it possible to form a high-quality high-gloss image having an improved solid uniformity, not possible in the conventional art, and free from the occurrence of boundary blurs.

As an ink-jet recording system in accordance with the present invention, any recording system may be used as long as it can cause ink to fly effectively out of a nozzle to apply the ink to a recording medium as a target. However, a system such as that described in Japanese Patent Laid-Open No. 59936/1979 can be used particularly effectively, in which, when ink receives thermal energy, the volume of ink is abruptly changed and ink is ejected through a nozzle by an operating force caused by this change in state.

Figure 1:
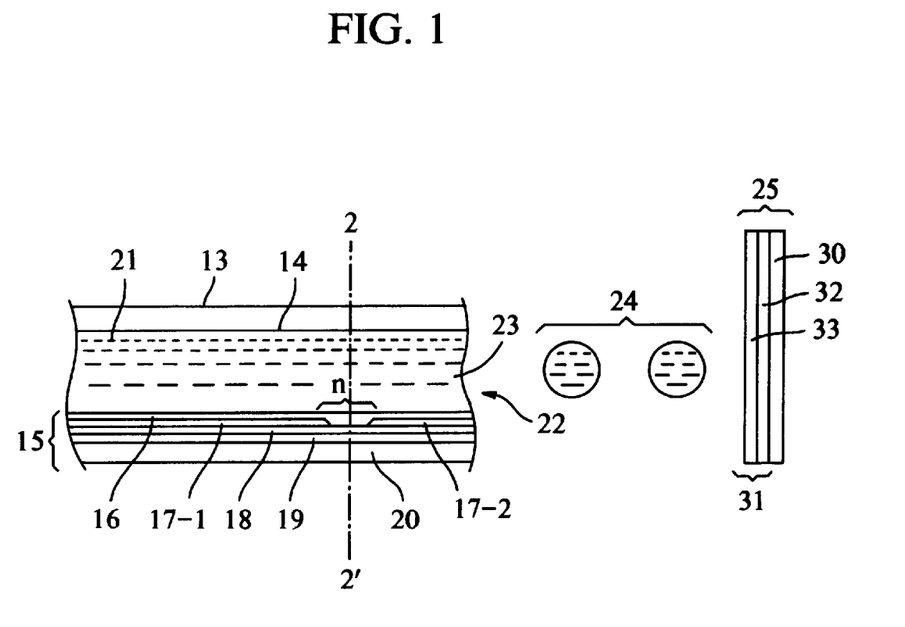
FIG. 1 is a longitudinal sectional view of a head of an ink-jet recording apparatus of the present invention.
Figure 2:
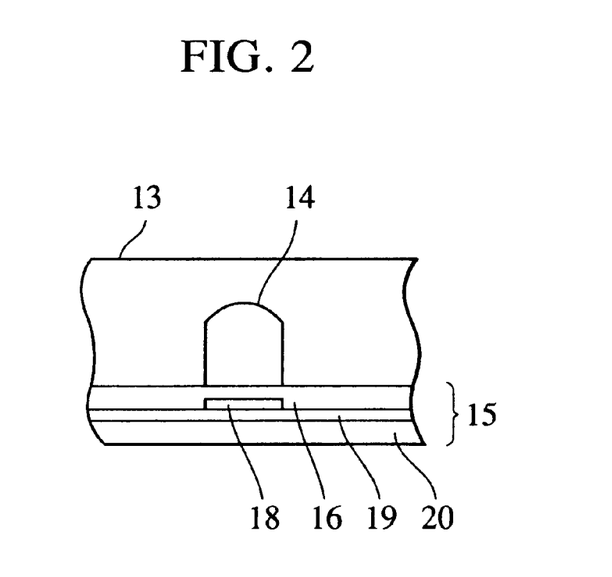
FIG. 2 is a transverse sectional view of the head of the ink-jet recording apparatus taken along section 2–2' of FIG. 1.
Figure 3:
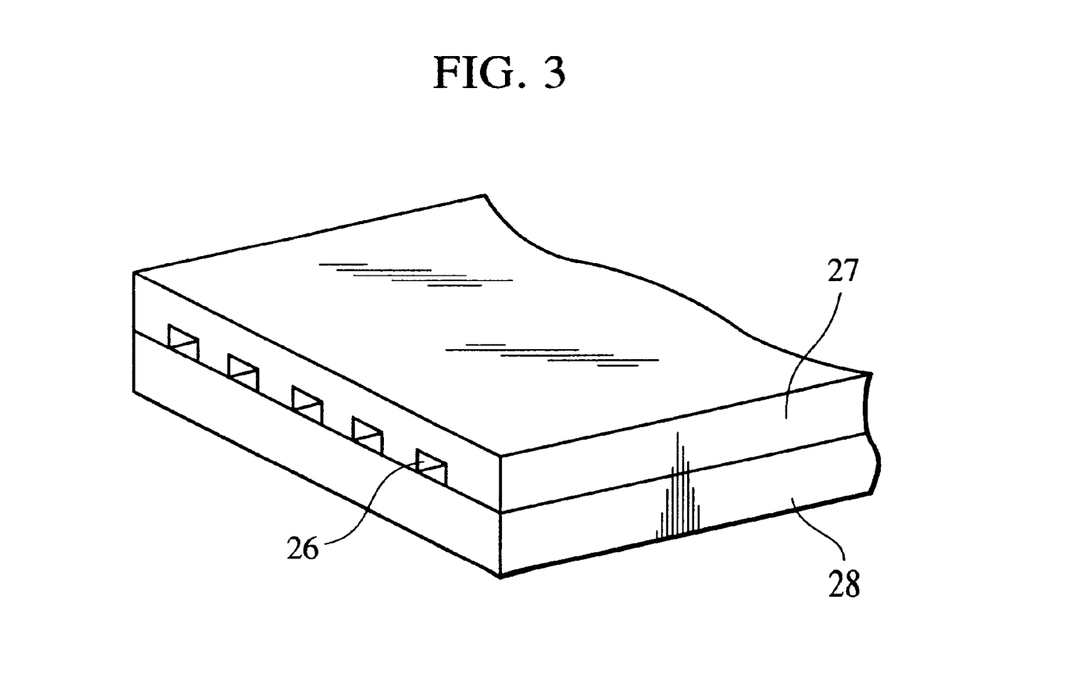
FIG. 3 is a perspective view of the external appearance of a head having a multi-head structure.

An example of an ink-jet recording apparatus suitable for the ink-jet recording method of the present invention will now be described. FIGS. 1, 2, and 3 show an example of the construction of a head which is an essential portion of this apparatus.

The recording head 13 is obtained by bonding a plate-like member made of glass, ceramic or a plastic and having a channel 14 for forming an ink flow to a heating head 15 used for thermal recording. (The invention is not limited to the illustrated head.) The heating head 15 has a protective film 16 formed of silicon oxide, aluminum electrodes 17-1 and 17-2, a heating resistor layer 18 formed of nichrome or the like, a heat accumulation layer 19, and a substrate 20 formed of alumina or the like and having a suitable heat radiating effect.

Recording ink 21 fills the channel to an ejection orifice (very small hole) 22 and forms a meniscus 23 due to pressure.

When an electric signal is applied between the electrodes 17-1 and 17-2, heat is abruptly developed in a region of the heating head 15 indicated at n, a bubble is thereby formed in recording ink 21 which is in contact with this region, and meniscus 23 of the ink is projected by the pressure of the bubble. Ink 21 is thereby ejected in the form of a recording ink droplet 24 from the orifice 22 and flies toward a recording sheet 25 having a base 30 and a coating layer 31. The coating layer may comprise an upper layer 33 and a lower layer 32. FIG. 3 schematically shows the external appearance of a multi-head in which a multiplicity of nozzles, each corresponding to the head shown in FIG. 1, are arranged. This multi-head is made by tightly connecting a glass plate 27 having a multiplicity of grooves 26 and a heating head 28 similar to that described above with reference to FIG. 1.

FIG. 1 is a cross-sectional view of the head taken along an ink passage, and FIG. 2 is a cross-sectional view taken along the line 2–2' of FIG. 1.

Figure 4:
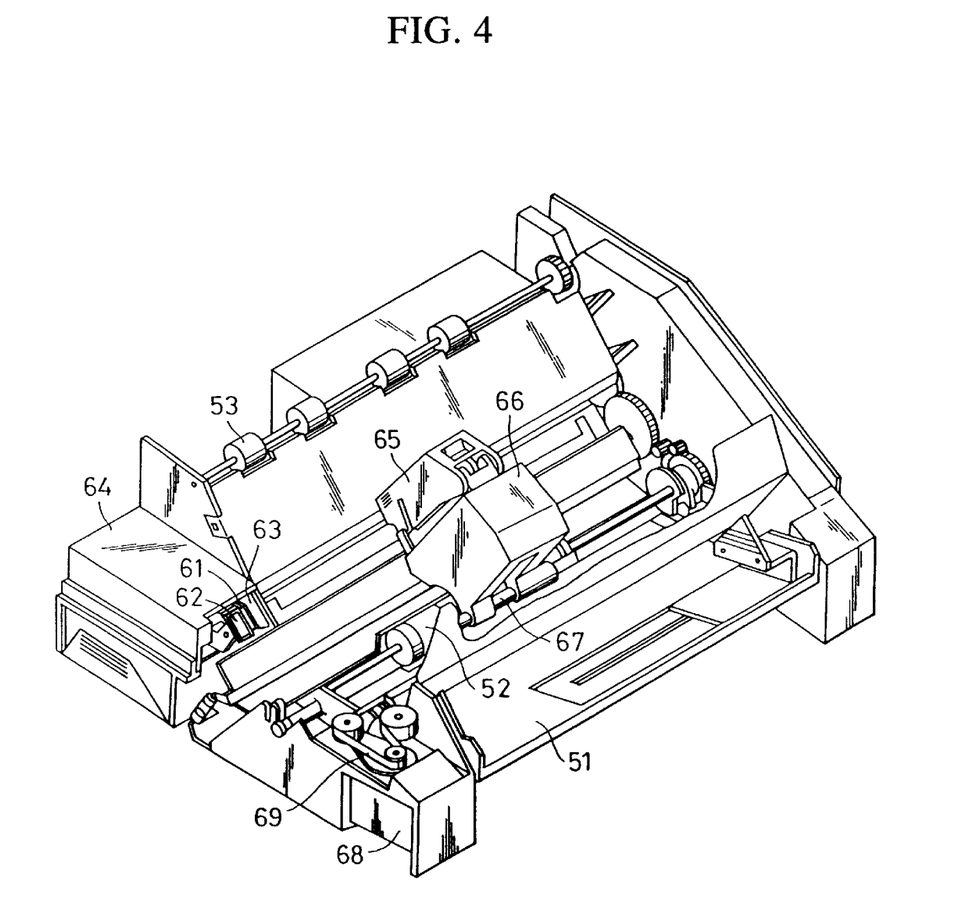
FIG. 4 is a perspective view of an example of the ink-jet recording apparatus.

FIG. 4 shows an example of an ink-jet recording apparatus in which the thus-constructed head is incorporated. As shown in FIG. 4, a blade 61 is provided as a wiping member. The blade 61 has a fixed end retained by a blade retaining member and has the form of a cantilever. The blade 61 is positioned adjacent a recording area where recording is performed by a recording head 65. In this example, the blade 61 is retained so as to project into the path of movement of the recording head. A cap 62 is disposed in a home position adjacent the blade 61. The cap 62 is moved in a direction perpendicular to the direction of movement of the recording head and can abut an outlet surface of the recording head to cap it. An ink absorbing member 63 is disposed adjacent the blade 61 and is retained so as to project into the recording head's path of movement as does the blade 61. The blade 61, the cap 62 and the absorbing member 63 form an ejection recovery unit 64. Water, dust and the like are removed from the ink outlet surface by the blade 61 and the absorbing member 63.

The recording head 65 has ejection energy generation means and performs recording by ejecting ink to a recording medium facing the outlet surface in which outlet openings are arranged. The recording head 65 is mounted on a carriage 66 and is moved with the carriage 66. The carriage 66 is swingably engaged with a guide shaft 67 and has a portion connected to a belt 69 driven by a motor 68 (not shown). The carriage 66 can be moved thereby along the guide shaft 67 over the recording head 65 recording area and adjacent areas.

A sheet feeder unit 51 is provided to insert recording medium sheets into the apparatus. A roller 52 is a sheet feed roller which is driven by a motor (not shown). By these sheet supply means, a recording medium sheet is fed so as to face the outlet surface of the recording head. As recording proceeds, the recording medium is discharged via discharge rollers 53.

In the thus-constructed apparatus, when the recording head 65 is returned to its home position, for example, after the completion of recording, the cap 62 of the head recovery unit 64 recedes out of the recording head 65 path of movement, but the blade 61 projects into the traveling path. Consequently, the outlet surface of the recording head 65 is wiped with the blade 61. When capping is performed by bringing the cap 62 into contact with the outlet surface of the recording head 65, the cap 62 is moved so as to project into the recording head path of movement.

When the recording head 65 is moved from the home position to the recording start position, the cap 62 and the blade 61 are in the same positions as at the time of wiping described above. During this movement, therefore, the outlet surface of the recording head 65 is also wiped.

The recording head is also moved to the home position adjacent the recording area with a predetermined spacing when the recording head is moved over the recording area to perform recording, as well as at the time of completion of recording or ejection recovery. Wiping is also performed during this movement.

As mentioned above, the present invention aims mainly to solve the problem of density unevenness of a solid portion of the recorded image and the problem of boundary blur in forming a recorded image which has improved surface gloss by using an ink jet recording system. These problems have arisen with the increases in recording speed and density and with the development of multi-color arrangements. Therefore, these problems are not so serious when the recording speed and the recording density are low. The recording method of the present invention is used advantageously under the conditions described below. Recording is performed by ejecting small droplets of inks of different colors through orifices at a drive frequency of at least 3 kHz and, preferably, 5 to 20 kHz. At least two orifices are provided to eject each color ink so that two or more ink droplets of each color can be ejected substantially simultaneously. The maximum recording density of each single color ink is at least 6 nl/mm$^2$, and may preferably be as high as the range of 7 to 20 nl/mm$^2$.

The maximum recording density referred to herein is a value obtained by multiplying the maximum number of dots of a single color ink attached in a unit area by the volume of ink droplets ejected.

EXAMPLES

The present invention will be described in further detail with respect to examples of the recording medium. In the following, "parts" or "%" represents parts or % by weight, unless otherwise noted.

(Preparation of recording mediums 1 to 3)

90 parts of LBKP and 10 parts of NBKP, provided as raw-material pulp, were mixed and beaten. Thereafter, 10 parts of kaolin (a product from Tsuchiya Kaolin), 0.1 part of alkenyl succinic acid anhydride and 0.2 part of cationic starch were blended. A base paper was made from the mixture by a method known in the art, so as to have a basis weight of 72 g/m$^2$ and a Stöckigt sizing degree of 10 sec. Each of the coating liquids (1) for forming a coating layer, having compositions shown below, was applied to the base paper with a wire bar so as to make a dry coat weight of 10 g/m$^2$, followed by drying at 100° C. for 5 minutes. An undercoating layer was thereby formed. Thereafter, each of the coating liquids (2) for forming a cast layer, having the compositions shown below, was applied by using a wire bar at a dry coat weight of 5 g/m$^2$. When the coating was still wet, the paper was pressed to a stainless roll heated at 120° C., thus preparing a recording medium used in accordance with the present invention.

(Coating liquid (1) compositions)

(Medium 1)

| | |
|---|---|
| silica (Sylysia 440, a product from Fuji Sylysia) | 100 parts |
| polyvinyl alcohol (PVA-117, a product from Kuraray) | 15 parts |
| polyallylamine hydrochloride (PAAHCl-3L, a product from Nittho Boseki) | 10 parts |
| water | 875 parts |

(Medium 2)

| | |
|---|---|
| basic magnesium carbonate (a product from Tokuyama Soda) | 100 parts |
| polyvinyl alcohol (PVA-117, a product from Kuraray) | 15 parts |
| copolymer of monoallylamine and dimethylallylamine (PAA-D11-HCl, a product from Nittho Boseki) | 10 parts |
| water | 975 parts |

(Medium 3)

| | |
|---|---|
| Silica (Mizukasil P-78D, a product from Mizusawa Kagaku) | 100 parts |
| polyvinyl alcohol (PVA-117, a product from Kuraray) | 15 parts |
| polyallylamine (PAA-10C, a product from Nittho Boseki) | 10 parts |
| water | 975 parts |

(Coating liquid (2) compositions)

(Medium 1)

| | |
|---|---|
| low-density polyethylene (Chemipearl M-200, a product from Mitsui Sekiyu Kagaku) | 50 parts |
| ionomer resin (Chemipearl SA-100, a product from Mitsui Sekiyu Kagaku) | 7 parts |

-continued

| | |
|---|---|
| alumina sol (520, a product from Nissan Kagaku) | 50 parts (as a solid content) |
| calcium stearate | 3 parts |
| water | 490 parts |

(Medium 2)

| | |
|---|---|
| ethylene-vinyl acetate copolymer (Flowvac Q16079N, a product from Seitetsu Kagaku) | 50 parts |
| alumina sol (520, a product from Nissan Kagaku) | 50 parts (as a solid content) |
| carboxymethylcellulose (Metolose 60SH, a product from Shin-Etsu Kagaku) | 20 parts |
| calcium stearate | 5 parts |
| water | 475 parts |

(Medium 3)

| | |
|---|---|
| polyamide resin (Tointhermotack SK-1, product from Tokyo Ink) | 50 parts |
| Styrene-butadiene rubber (JSR6619, a product from Nihon Gosei Gomu) | 15 parts |
| alumina sol (520, a product from Nissan Kagaku) | 50 parts (as a solid content) |
| lead stearate | 3 parts |
| water | 482 parts |

(Preparation of mediums 4, 5)

Each of the coating liquids having the compositions shown below was applied to the base paper with an applicator so that the coating weight was 10 g/m$^2$ in dry solid content. The coating layer was then treated with a calcium formate 10% aqueous solution and was pressed to a stainless steel roll heated to 100° C. when it was in a wet state. The coating layer was dried to obtain a recording medium 4 or 5 having specular gloss on its surface and used in accordance with the present invention.

(Coating liquid compositions)

(Medium 4)

| | |
|---|---|
| fine powder silica (Mizukasil P-78D, a product from Mizusawa Kagaku) | 60 parts |
| polyvinyl alcohol (PVA-117, a product from Kuraray) | 10 parts |
| styrene-butadiene latex (a product from Sumitomo Naugatuck) | 10 parts |
| polyallylamine (PAA-10C, a product from Nittho Boseki) | 20 parts |
| water | 900 parts |

(Medium 5)

Fine powder silica in the composition for Medium 4 was replaced with silica (Sylysia 440, a product from Fuji Sylysia)

(Medium 6)

A recording medium used in accordance with the present invention was prepared by forming an undercoating layer in the same manner as Medium 1, then applying a coating material for forming a top coating layer, drying the coating at 60° C. for 20 minutes by a conventional method, and processing the material with a super calender heated to 80° C.

(Preparation of comparative mediums)

(Medium 7)

Medium 7 was prepared in the same manner as Medium 1 except that polyallylamine was omitted from the coating liquid (1).

(Medium 8)

Only the undercoating layer of Medium 1 was formed.

(Medium 9)

Medium 9 was formed by using white polyethylene terephthalate film (Melinex, a product of ICI), by applying the coating liquid having the composition shown below to the base so that the dry coating weight was 10 g/m$^2$, and drying the coating at 100° C. for 3 minutes.

(Coating liquid Composition)

| | |
|---|---|
| polyvinyl alcohol (PVA-217, a product from Kuraray) | 100 parts |
| water | 900 parts |

Multi-color recording was performed on the above-described recording mediums under the conditions shown below by using inks of the present invention and comparative inks having the compositions shown below and by bubbling the inks with thermal energy. The combinations of the recording mediums and the inks used for recording are shown in Table 1.

(Ink compositions)

| | | |
|---|---|---|
| dyes | | 4 parts |
| glycerol | | 6 parts |
| thiodiglycol | | 6 parts |
| urea | | 8 parts |
| acetylene glycol (Surfynol 104, a product from Nisshin Kagaku) | | x parts |
| water | | 76−x parts |
| dyes: | | |
| Y: | | C.I. Direct Yellow #86 |
| M: | | C.I. Acid Red #23 |
| C: | | C.I. Direct Blue #199 |
| Bk: | | C.I. Food Black #2 |
| Ink A: | x = 0.3, surface tension: | 46 dyne/cm |
| Ink B: | x = 1, surface tension: | 29 dyne/cm |
| Ink C: | x = 3, surface tension: | 26 dyne/cm |
| Ink D: | x = 10, surface tension: | 21 dyne/cm |
| Ink E: | x = 1, surface tension: | 31 dyne/cm, |
| Acetylene alcohol (Surfynol 61, a product from Nisshin Kagaku) was used in place of acetylene glycol. | | |
| Ink F: | x = 1.5, surface tension: | 33 dyne/cm |
| Polyoxyethylene nonyl phenyl ether (Noigen EA-5, a product from Daiichi Kagaku) was used in place of acetylene glycol. | | |
| Ink G: | acetylene glycol  x = 0.4, surface tension: | 42 dyne/cm |
| Ink H: | acetylene glycol  x = 0.6, surface tension: | 38 dyne/cm |

(Recording conditions)

| | |
|---|---|
| Ejection frequency: | 5 kHz |
| Volume of ejected droplets: | 50 pl |
| Recording density: | 360 dpi |
| Single color maximum recording density: | 10 nl/mm$^2$ |

The color print samples obtained were evaluated with respect to the following criteria.

(Evaluation criteria)

(1) Image Density

The image density of black (Bk) of the prints solid-printed by using the above-described printing apparatus was evaluated with a Macbeth densitometer RD-918, as were the prints having intermediate results are indicated by B.

(3) Surface Gloss

The 75° and 20° specular glosses in accordance with JIS-Z-8741 were measured with a digital declination glossmeter UGV-5D (manufactured by Suga Shikenki).

(4) Waterfastness

One droplet of water was put on characters printed with the above-described recording apparatus and was allowed to dry. The result was evaluated by visual observation. The prints having no running of the image are indicated by B. The prints having no running of the image and no character thickening are indicated by A. The prints at other inferior levels are indicated by C.

(5) Total Evaluation

The prints having excellent or good evaluation results with respect to all the criteria were totally evaluated as A, the print equivalent to those evaluated as A but rather inferior in glossiness was totally evaluated as B, and the prints having one or more unsatisfactory results in their evaluation results were totally evaluated as C.

Table 1 shows the results of the evaluations described above. other samples.

(2) Image Unevenness was Evaluated with Respect to the Following Two Properties.

(i) Solid Uniformity

The prints printed by the above-described recording apparatus and having no density unevenness recognizable in their solid printed portions of black, yellow, magenta, cyan, green and blue are indicated by A while the prints having certain density unevenness in such solid printed portions recognizable even with the eye at a distance of 25 cm from the print surface are indicated by C. The prints having no density unevenness recognizable in printed portions respectively single-color-printed in black, yellow, magenta and cyan but each having certain density unevenness recognizable in a portion printed in a color produced by mixing two single color inks, i.e., a red, green or blue portion, are indicated by B.

(ii) Boundary Blur

The prints having boundary lines clearly recognizable with the eye at a distance of 25 cm from the print surface in their solid printed portions where red, green and blue, which are each a color produced by mixing two single color inks, abut on each other are indicated by A. The prints in which the colors were mixed so that no boundary could be recognized as a single line are indicated by C, and the

TABLE 1

Results of Evaluation

| Comp. Ex. | Ex. | Content Medium | Ink | Image Density | Solid Uniformity | Boundary Blur | Glossiness 75° | Glossiness 20° | Waterfastness | Total Evaluation |
|---|---|---|---|---|---|---|---|---|---|---|
| 1 |   | 1 | A | 1.41 | C | A | 75% | 28% | B | C |
|   | 1 | 1 | B | 1.48 | A | A |   |   | A | A |
|   | 2 | 1 | C | 1.46 | A | B |   |   | A | A |
| 2 |   | 1 | D | 1.40 | A | C |   |   | B | C |
|   | 3 | 1 | E | 1.45 | A | A |   |   | B | A |
|   | 4 | 1 | F | 1.42 | A | A |   |   | B | A |
| 3 |   | 2 | A | 1.36 | C | A | 75% | 27% | B | C |
|   | 5 | 2 | B | 1.44 | A | A |   |   | A | A |
|   | 6 | 2 | C | 1.44 | A | B |   |   | A | A |
| 4 |   | 2 | D | 1.37 | A | C |   |   | B | C |
| 5 |   | 3 | A | 1.40 | C | A | 78% | 30% | B | C |
|   | 7 | 3 | B | 1.52 | A | A |   |   | A | A |
|   | 8 | 3 | C | 1.51 | A | B |   |   | A | A |
| 6 |   | 3 | D | 1.46 | A | C |   |   | B | C |
| 7 |   | 4 | A | 1.42 | C | A | 72% | 25% | B | C |
|   | 9 | 4 | B | 1.52 | A | A |   |   | A | A |
|   | 10 | 4 | C | 1.51 | A | A |   |   | A | A |
| 8 |   | 4 | D | 1.46 | A | C |   |   | B | C |
|   | 11 | 5 | B | 1.48 | A | A | 73% | 25% | A | A |
|   | 12 | 6 | B | 1.42 | A | A | 53% | 15% | A | B |
| 9 |   | 7 | B | 1.49 | A | A | 74% | 24% | C | C |
| 10 |   | 8 | B | 1.56 | A | A | 2% | 1% | A | C |
| 11 |   | 9 | B | 1.50 | C | A | 79% | 31% | C | C |
| 12 |   | 1 | G | 1.43 | C | A | 75% | 28% | B | C |
|   | 13 | 1 | H | 1.46 | B | A |   |   | B | A |
| 13 |   | 2 | G | 1.37 | C | A | 75% | 27% | B | C |
|   | 14 | 2 | H | 1.42 | B | A |   |   | B | A |
| 14 |   | 3 | G | 1.42 | C | A | 78% | 30% | B | C |
|   | 15 | 3 | H | 1.49 | B | A |   |   | B | A |
| 15 |   | 4 | G | 1.44 | C | A | 72% | 25% | B | C |
| 16 |   | 4 | H | 1.49 | B | A |   |   | B | A |

As described above, the present invention makes it possible to form a high-precision, high-quality image having high optical density, to form a recorded image having improved waterfastness, and further to form a recorded image having surface gloss as high as that of silver salt photographs.

While the present invention has been described with respect to what is presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A color ink-jet recording method comprising the steps of:
   providing a recording medium having a base and coating layers provided on the base, the coating layers being porous and comprising a porous upper layer and a porous lower layer, the upper layer having surface gloss, and the lower layer containing a pigment, a binder and a cationic material;
   preparing color inks so that each color ink has a surface tension within a range of 25 to 40 dyne/cm;
   ejecting a droplet of each of a plurality of the color inks through an orifice of a recording head in accordance with a recording signal; and
   attaching said droplet to the recording medium to form an image.

2. A color ink-jet recording method according to claim 1, wherein the upper layer having surface gloss has a 75° specular gloss of 45% or higher.

3. A color ink-jet recording method according to claim 1, wherein the pigment comprises a material selected from the group consisting of silica and basic magnesium carbonate.

4. A color ink-jet recording method according to any one of claims 1 to 3, wherein the base comprises paper.

5. A color ink-jet recording method according to claim 1, wherein the cationic material comprises a cationic resin.

6. A color ink-jet recording method according to claim 5, wherein the cationic material comprises a material selected from the group consisting of polyallylamine, polyvinylamine, chitosan and salts of polyallylamine, polyvinylamine and chitosan.

7. A color ink-jet recording method according to claim 1, wherein the upper layer is made of at least one material selected from the group consisting of acrylic polymer latexes, conjugated diene copolymer latexes and ethylene-vinyl acetate polymer latexes.

8. A color ink-jet recording method according to claim 1, wherein a ratio of the pigment to the binder is within a range of 10/1 to 1/2 by weight.

9. A color ink-jet recording method according to claim 8, wherein a ratio of the pigment to the binder is within a range of 5/1 to 1/1 by weight.

10. A color ink-jet recording method according to claim 1, wherein the cationic material is present in the coating layers within a range of 0.1 to 30 percent by weight of the coating layers.

11. A color ink-jet recording method according to claim 1, wherein each color ink has a surface tension within a range of 30 to 40 dyne/cm.

12. A color ink-jet recording method according to claim 1, wherein black ink having a surface tension within a range of 25 to 55 dyne/cm is further used.

13. A color ink-jet recording method according to claim 1, wherein each ink has a liquid medium component which is composed of at least one of water-miscible glycols and glycol ethers.

14. A color ink-jet recording method according to claim 1, wherein each ink comprises a material selected from the group consisting of direct dyes and acid dyes.

15. A color ink-jet recording method according to claim 1, wherein at least two orifices are provided with respect to each ink having one color, and at least two droplets of each ink of one color are ejected substantially simultaneously through the orifices to form an image.

16. A color ink-jet recording method according to claim 1, wherein ink droplets of each color are ejected at a drive frequency not lower than 3 kHz.

17. A color ink-jet recording method according to claim 1 or 12, wherein ink droplets of each color are ejected at a drive frequency in a range of 5 to 20 kHz.

18. A color ink-jet recording method according to claim 1 or 12, wherein the ink of each color has a maximum recording density not lower than 6 nl/mm$^2$.

19. A color ink-jet recording method according to claim 1 or 12, wherein the ink of each color has a maximum recording density within a range of 7 to 20 nl/mm$^2$.

20. A color ink-jet recording method according to claim 1 or 12, wherein ink is ejected due to thermal energy.

* * * * *

UNITED STATES PATENT AND TRADEMARK OFFICE
CERTIFICATE OF CORRECTION

PATENT NO.    : 6,174,056 B1
DATED         : January 16, 2001
INVENTOR(S)   : Sakaki et al.

It is certified that error appears in the above-identified patent and that said Letters Patent is hereby corrected as shown below:

<u>Title page,</u>
Item [56], References Cited, FOREIGN PATENT DOCUMENTS,
"647914" should read -- 6-47914 --.

<u>Column 12,</u>
Lines 8 to 35, should be deleted;
Line 36, "above." should be deleted;
Line 64, after "the", the following should be inserted:
-- prints having immediate results are indicated by B.

(3) Surface Gloss

The 75° and 20° specular glosses in accordance with JIS-Z-8741 were measured with a digital declination gloss-meter UGV-5D (manufactured by Suga Shikenki).

(4) Waterfastness

One droplet of water was put on characters printed with the above-described recording apparatus and was allowed to dry. The result was evaluated by visual observation. The prints having no running of the image and no character thickening are indicated by A. The prints at other inferior levels are indicated by C.

UNITED STATES PATENT AND TRADEMARK OFFICE
CERTIFICATE OF CORRECTION

PATENT NO.    : 6,174,056 B1
DATED         : January 16, 2001
INVENTOR(S)   : Sakaki et al.

It is certified that error appears in the above-identified patent and that said Letters Patent is hereby corrected as shown below:

(5) Total Evaluation

The prints having excellent or good evaluation results with respect to all the criteria were totally evaluated as A, the print equivalent to those evaluated as A but rather inferior in glossiness was totally evaluated as B, and the prints having one or more unsatisfactory results in their evaluation results were totally evaluated as C.

Table 1 shows the results of the evaluations described above. --.

Signed and Sealed this

Fourth Day of February, 2003

JAMES E. ROGAN
*Director of the United States Patent and Trademark Office*